(12) United States Patent
Nakache et al.

(10) Patent No.: US 7,773,662 B2
(45) Date of Patent: Aug. 10, 2010

(54) SYNCHRONIZING TO SYMBOLS RECEIVED VIA WIRELESS COMMUNICATIONS CHANNEL

(75) Inventors: Yves-Paul Nakache, Cambridge, MA (US); Nikolaus Lehmann, Jersey City, NJ (US)

(73) Assignee: Renesas Technology Corporation, Tokyo (JP)

( * ) Notice: Subject to any disclaimer, the term of this patent is extended or adjusted under 35 U.S.C. 154(b) by 1190 days.

(21) Appl. No.: 11/369,867

(22) Filed: Mar. 8, 2006

(65) Prior Publication Data

US 2007/0237274 A1 Oct. 11, 2007

(51) Int. Cl.
*H04L 27/30* (2006.01)
(52) U.S. Cl. .............. 375/142; 375/150; 375/355; 375/366; 370/511; 370/512
(58) Field of Classification Search .............. 375/142, 375/143, 150, 152, 354, 355, 362, 365, 366, 375/367, 346; 370/503, 509, 511, 512, 513
See application file for complete search history.

(56) References Cited

U.S. PATENT DOCUMENTS

| | | | | |
|---|---|---|---|---|
| 6,990,061 B2 * | 1/2006 | Deneire et al. | .............. | 370/210 |
| 7,154,975 B1 * | 12/2006 | Bohnke et al. | .............. | 375/368 |
| 7,313,085 B2 * | 12/2007 | Kim | .............. | 370/208 |
| 7,415,059 B2 * | 8/2008 | Chadha et al. | .............. | 375/343 |
| 7,548,506 B2 * | 6/2009 | Ma et al. | .............. | 370/208 |
| 7,627,067 B2 * | 12/2009 | Coulson | .............. | 375/362 |
| 2004/0047368 A1 | 3/2004 | Xu | | |
| 2004/0105512 A1 | 6/2004 | Priotti | | |
| 2005/0163265 A1 | 7/2005 | Gupta | | |
| 2005/0232137 A1 * | 10/2005 | Hosur et al. | .............. | 370/208 |

OTHER PUBLICATIONS

Luc Deneire, "Chapter 6: Avoiding a Tower of Babel", Wireless OFDM Systems, 2002, Edited by Marc Engels, IMEC, Belgium, Kluwer Academic Publishers (cited in the specification).

* cited by examiner

*Primary Examiner*—Dac V Ha
(74) *Attorney, Agent, or Firm*—Buchanan Ingersoll & Rooney, PC

(57) ABSTRACT

Synchronization techniques for reducing the effects of time dispersive wireless communications channels are presented. A synchronization technique for communications over a time dispersive wireless channel includes receiving a signal having at least identical first and second symbols, and calculating a metric for each sampling time by correlating respective samples of the first symbol included in a first sampling window with respective samples of the second symbol included in a second sampling window. The technique further includes identifying one of the sampling times at which the metric attains a maximum value, and estimating an optimal time offset for synchronizing to the received signal based on the identified sampling time. Optionally, the technique further includes estimating a carrier frequency offset based on the difference of phase of the complex conjugate samples at the maximum absolute value of the metric.

19 Claims, 7 Drawing Sheets

SYNCHRONIZING TO SYMBOLS RECEIVED VIA WIRELESS COMMUNICATIONS CHANNEL

CROSS-REFERENCE TO RELATED APPLICATIONS

This disclosure is related to U.S. patent application No. TBD, entitled "DETECTING AND SYNCHRONIZING TO FREQUENCY HOPPED PACKETS," by Yves-Paul Nakache, filed concurrently herewith.

FIELD OF THE DISCLOSURE

The present disclosure involves the field of wireless communications. More particularly, the present disclosure relates to techniques for receiving and processing orthogonal frequency division multiplexing (OFDM) symbols.

DESCRIPTION OF THE RELATED ART

Different techniques for receiving and processing OFDM symbols have been proposed. For example, U.S. Patent Application Publication No. 2005/016325 (published Jul. 28, 2005) relates to a timing estimation system and methodology for an OFDM receiver. Similarly, U.S. Patent Application Publication No. 2004/0105512 (published Jun. 3, 2004) pertains to a two-step synchronization procedure for OFDM receivers, and U.S. Patent Application Publication No. 2004/0047368 (published Mar. 11, 2004) pertains to an OFDM frame synchronization system. Additionally, *Wireless OFDM Systems* 95-111 (Marc Engels ed., Kluwer Academic Publishers 2002) provides a discussion of synchronization in wireless OFDM systems.

BACKGROUND OF THE INVENTION

A problem in wireless communications is processing symbols received via a time dispersive channel. A time dispersive channel causes interference between symbols due to a spreading of the symbol energy in the time domain. The delay spread of a channel is indicative of the degree of channel dispersion. Also, transmitting symbols at higher data rates generally requires symbol duration and distance between the symbols to be reduced. Thus, the higher the data rate, the closer together the symbols, and the stronger the interference between symbols, in many transmission schemes.

Orthogonal Frequency Division Multiplexing (OFDM) is an effective modulation technique for reducing such interferences. OFDM operates by transmitting blocks of multiple symbols in parallel over a channel. This technique results in much larger OFDM symbols being transmitted over a particular period, relative to other methods. Thus, because the symbol duration and the distance between symbols can be longer than the delay spread, the potential for overlap between symbols due to the dispersive channel is reduced. An example is a wireless personal area network (WPAN) designed according to the MBOA (WiMedia Multiband OFDM Alliance) PHY (physical layer) specifications v1.0, incorporated herein by reference, the current highest data rate of which is 480 Mbps. The delay spread of the channel can be several tens of nanoseconds. By grouping 100 symbols into one OFDM symbol having a duration of 312.5 nanoseconds and defining appropriate guard times between OFDM symbols, the effect of symbol interferences is reduced using these specifications.

More specifically, to further reduce OFDM symbol interferences, the OFDM symbols can be sent through multiple frequency bands (e.g., the MultiBand-OFDM transceiver detailed in the WiMedia MBOA PHY specifications v1.0 uses three sub-bands). Therefore, the distance between the OFDM symbols in one band can be increased to provide an additional protection against OFDM symbol interference, while maintaining or increasing the symbol transmission rate.

However, proper decoding of the received OFDM symbols requires synchronization (i.e., a correct estimation of the arrival time at the receiver of the OFDM symbols). Inaccurate synchronization results in inter-carrier interference (ICI). During the decoding of an OFDM symbol, ICI results in a loss of orthogonality between the multiple symbols making up the one OFDM symbol.

To reduce ICI, currently the orthogonality of the symbols is maintained by either preprocessing the blocks of symbols in a transmitter using a cyclic prefix, or post-processing the symbols using a zero padding technique. The zero padding technique operates by adding a tail of an OFDM symbol created by a time dispersive channel to the beginning of the OFDM symbol, as is described in more detail in the WiMedia MBOA PHY specifications.

While the general processing of OFDM symbols in the receiver is specified by the WiMedia OFDM PHY specifications, one challenging part of receiver design is selecting an optimal timing for processing and demodulating transmitted OFDM symbols. Also, the optimal timing depends on the type of preprocessing that was performed in the transmitter.

What is needed, therefore, are synchronization techniques for reducing the effects of time dispersive wireless communications channels.

BRIEF SUMMARY OF THE DISCLOSURE

Synchronization techniques for reducing the effects of time dispersive wireless communications channels are described herein. These techniques provide an optimal time for processing blocks of symbols during a training period in a receiver, in addition to an estimate of a carrier frequency offset between a transmitter and receiver.

In accordance with an aspect of the present invention, a synchronization method for communications over a time dispersive wireless channel includes receiving a signal comprising at least identical first and second symbols and calculating a metric for each sampling time by correlating respective samples of the first symbol included in a first sampling window with respective samples of the second symbol included in a second sampling window. The method further includes identifying a sampling time at which the metric attains a maximum value, and estimating an optimal time offset for synchronizing to the received signal based on the identified sampling time. Optionally, the method further includes estimating a carrier frequency offset based on the samples at the maximum absolute value of the metric.

In accordance with a second aspect of the present invention, a synchronization system for receiving communications transmitted over a time dispersive wireless channel includes a receiver unit that receives a signal, which includes at least identical first and second symbols, and a metric calculator unit coupled to the receiver unit. The metric calculator unit calculates a metric for each sampling time by correlating respective samples of the first symbol included in a first sampling window with respective samples of the second symbol included in a second sampling window. The metric calculator unit identifies a sampling time at which the metric attains a maximum value, and determines an optimal time offset for synchronizing to the received signal based on the identified sampling time. Optionally, the system further comprises a carrier frequency offset estimator coupled to the metric calculator unit that estimates a carrier frequency offset based on the phase of the complex conjugate samples at the maximum absolute value of the metric.

BRIEF DESCRIPTION OF THE DRAWING FIGURES

The objects and advantages of the present disclosure will be understood by reading the following detailed description in conjunction with the drawings in which.

DETAILED DESCRIPTION OF THE INVENTION

Overview

Synchronization techniques for reducing the effects of time dispersive wireless communications channels are described herein. In particular, techniques are presented for determining an optimal time for processing blocks of symbols during a training period in a receiver and for estimating a carrier frequency offset between a transmitter and receiver. The explanation will be by way of exemplary embodiments to which the present invention is not limited.

Exemplary OFDM Transceiver

Figure 1:
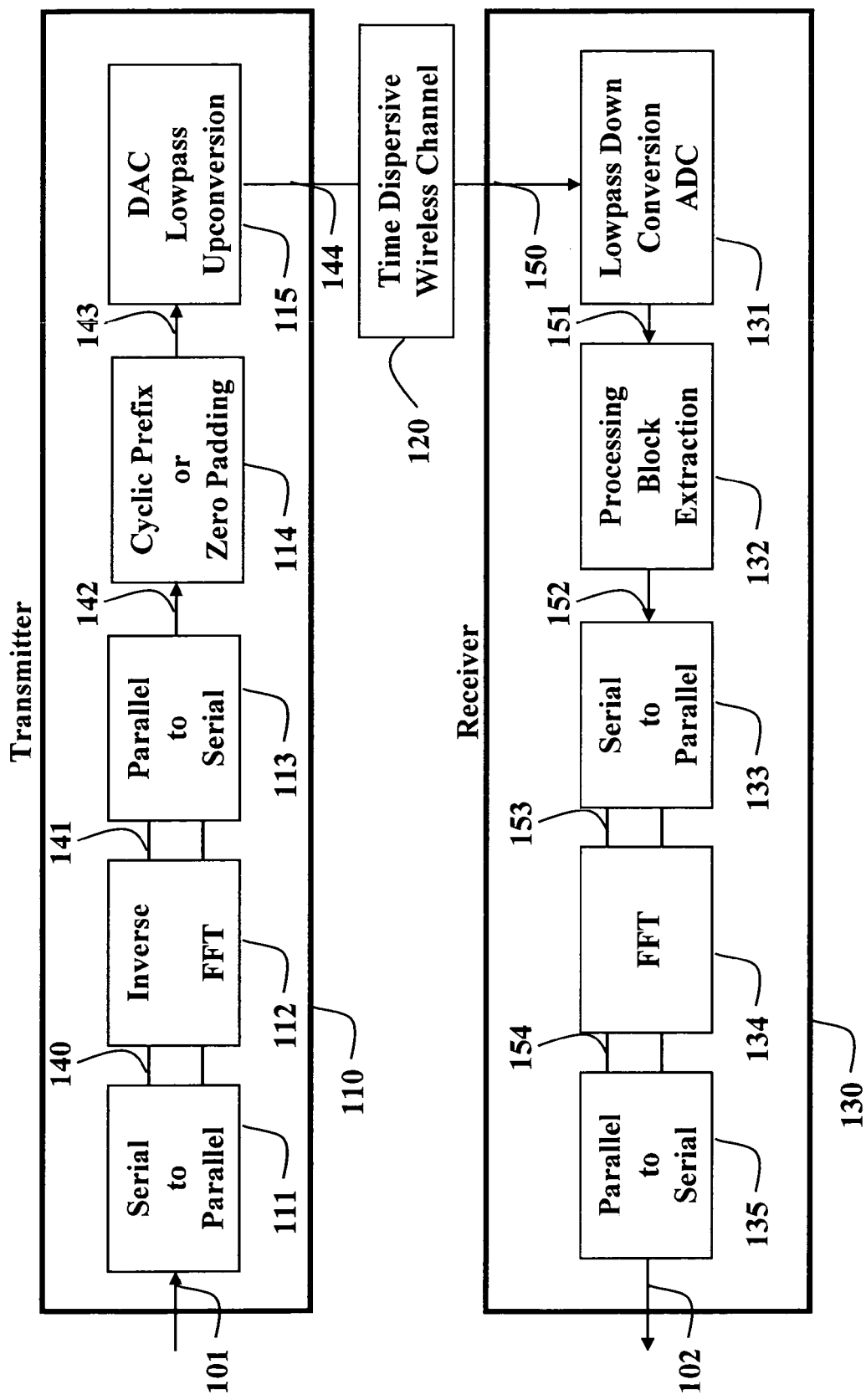
FIG. 1 is a block diagram of an exemplary conventional OFDM transceiver.

OFDM is an effective modulation technique for reducing the effects of a time dispersive wireless communications channel, such as inter symbol interference (ISI). OFDM operates by transmitting blocks of multiple symbols in parallel over a channel. FIG. 1 is a block diagram of an exemplary OFDM transceiver 100. OFDM transceiver 100 includes a transmitter 110 in communication with a receiver 130 via a time dispersive wireless communications channel 120.

The transmitter 110 includes a serial-to-parallel converter 111, an inverse fast Fourier transform (IFFT) calculator 112, a parallel-to-serial converter 113, a processing unit 114, and a digital-to-analog converter (DAC)/upconverter unit 115. As shown in FIG. 1, a serial stream of input symbols 101 is provided to the serial-to-parallel converter 111, which produces parallel signals 140. The IFFT calculator 112 applies an IFFT operation to the parallel signals 140 and produces transformed signals 141. The transformed signals 141 are provided to the parallel-to-serial converter 113, which produces a serial signal 142. The processing unit 114 processes the serial signal 142 to maintain orthogonality and produces a processed signal 143. For example, the processing unit 114 can apply a cyclic prefix or zero padding technique, as described above. The processed signal 143 is D/A converted and lowpass upconverted by the DAC/upconverter unit 115. The transmitter 110 outputs a converted signal 144, which is transmitted through the time dispersive wireless channel 120.

The receiver 130 includes a downconverter/analog-to-digital converter (ADC) unit 131, a block extraction processor 132, a serial-to-parallel converter 133, a fast Fourier transform (FFT) calculator 134, and a parallel-to-serial converter 135. As shown in FIG. 1, the receiver 130 receives a signal 150. The signal 150 is lowpass downconverted and A/D converted by the downconverter/ADC unit 131 to produce a converted signal 151. The block extraction processor 132 extracts blocks of symbols from the converted signal 151, generating an extracted signal 152. The serial-to-parallel converter 133 converts the extracted signal 152 to parallel signals 153. The FFT calculator 134 applies an FFT operation to the parallel signals 153, producing transformed signals 154. The transformed signals 154 are applied to the parallel-to-serial converter 135, which generates a serial stream of output symbols 102 corresponding to the input symbols 101.

Exemplary OFDM Transmission in a Time Dispersive Channel

Figure 2:
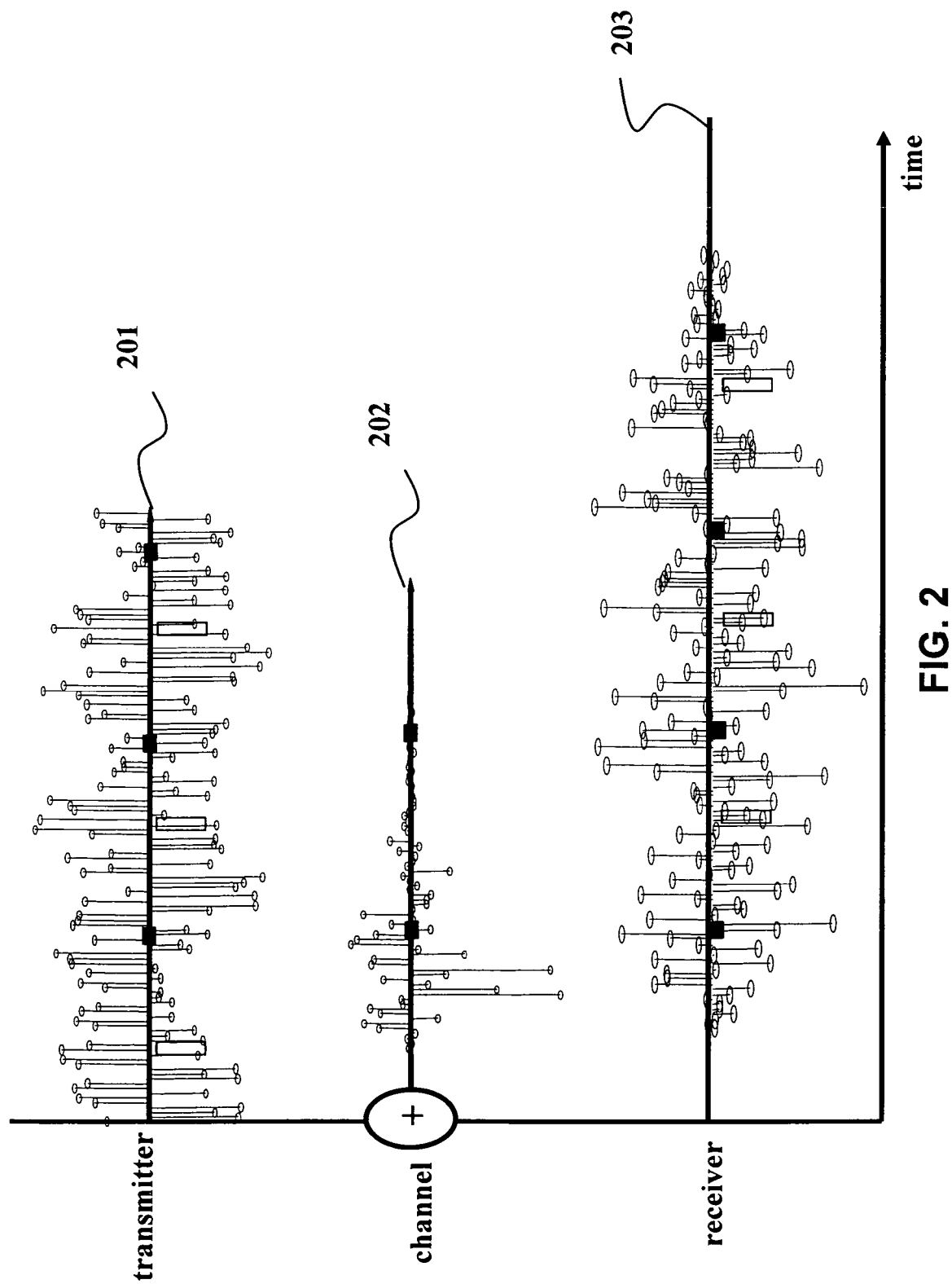
FIG. 2 is a timing diagram comparing transmitted and received OFDM symbols for a time dispersive communications channel.

FIG. 2 is a timing diagram comparing a transmitted OFDM block 201 to a received OFDM block 203 for a time dispersive wireless communications channel, such as time dispersive wireless channel 120 of FIG. 1. For example, assume the transmitter 110 multiplexes the input symbols 101 in an orthogonal manner within each block (i.e., each OFDM symbol), and allocates a non-duty time between transmitted blocks. As shown in FIG. 2, when the block 201 is transmitted over the time dispersive channel, the duration of the symbols of the received block 203 can be longer than the duration of the symbols of the transmitted block 201. This increase in symbol duration can be attributed to additive effects 202 of the time dispersive channel, which spreads the symbol energy in the time domain.

Exemplary Technique for Reestablishing Orthogonality

Figure 3:
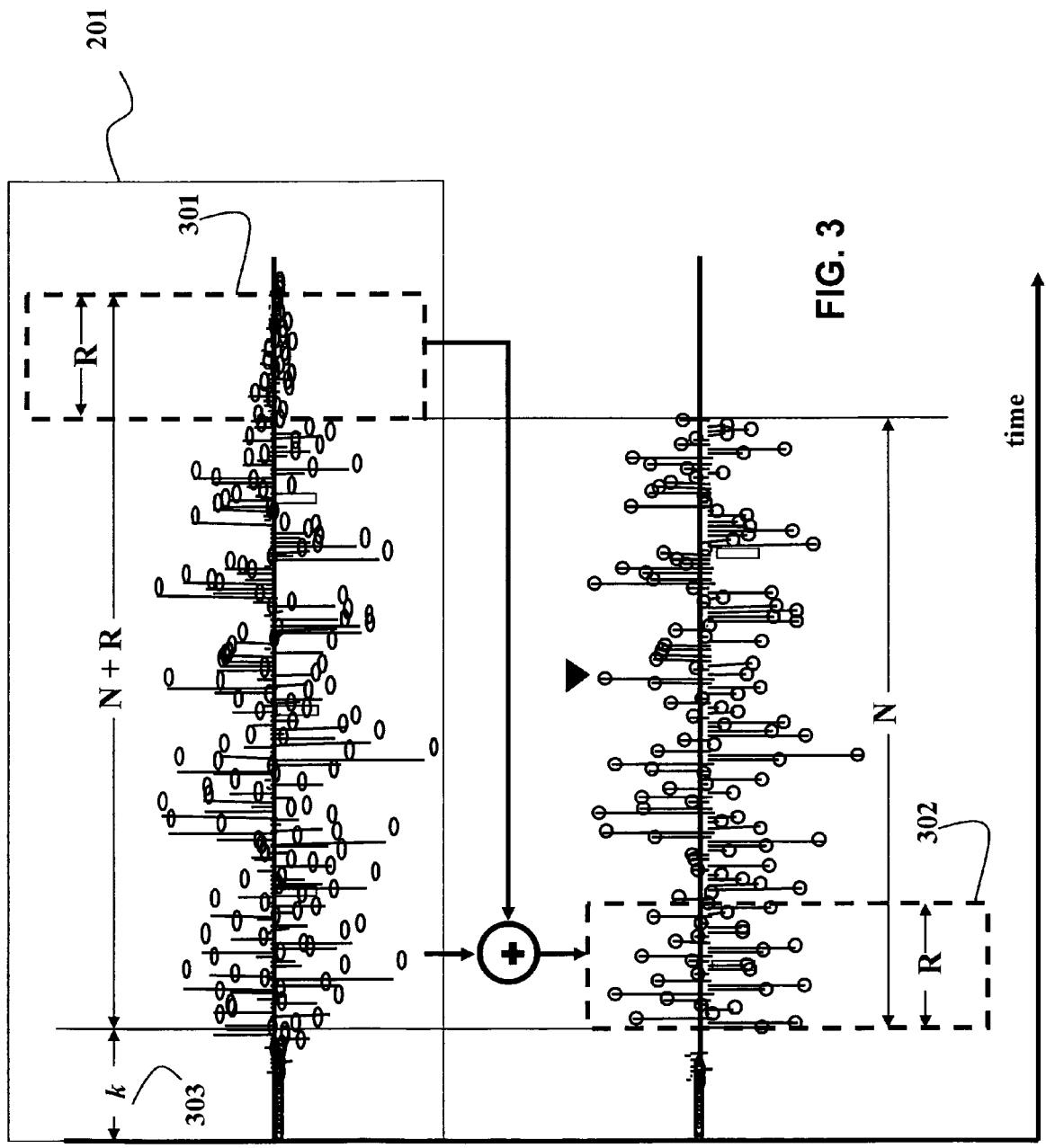
FIG. 3 is a timing diagram of a conventional zero padding technique for reestablishing orthogonality in the received OFDM symbol shown in FIG. 2.

FIG. 3 is a timing diagram of a zero padding technique for reestablishing orthogonality in the received block 203 shown in FIG. 2. Assume a transmitted OFDM symbol has a length of N samples, and a received OFDM symbol has a length of N+R samples, where the additional R samples are attributed to time dispersive channel conditions. As shown in FIG. 3, a receiver (e.g., the receiver 130 of FIG. 1) adds the samples 301 (from N+1 to N+R) at the end of the received OFDM symbol to the samples 302 (from 1 to R) at the beginning of the received OFDM symbol. This technique reestablishes orthogonality between the tones of the received block 203. Note that in the example of FIG. 3, the zero padding duration is equal to the length of the delay spread of the channel (i.e., R samples). Typically, the zero padding duration or the cyclic prefix duration is shorter than or longer than the delay spread of the channel.

Synchronization techniques for reducing the effects of time dispersive wireless communications channels are described below. In particular, techniques for determining an optimal time for receiving and processing OFDM symbols during a training period in a receiver and for estimating a carrier frequency offset between a transmitter and receiver are described below, followed by a discussion of exemplary systems and methods for implementing these techniques.

Technique for Estimating Optimal Time Offset for Synchronization in Time Dispersive Channels As described above, assume a transmitted OFDM symbol has a length of N samples, and a received OFDM symbol has a length of N+R samples, where the additional R samples are attributed to time dispersive channel conditions. As shown in FIG. 3, the receiver selects a time offset k from the beginning of the received block 201 to the beginning of the N+R samples in the processing period. Assuming the time dispersive channel has a time discrete impulse response h(n) that is longer than R samples, the task of selecting optimal time offset k is difficult.

Consider a first symbol transmitted during sampling instants 0 to N−1. The optimal beginning of the N+R processing period of this block is k'. An estimate of the time k' is as follows:

$$k' = \max_{k'=k} \sum_{n=k}^{k+R} |h(n)|^2. \quad (1)$$

The time k' maximizes a signal energy within the received block and also ensures that interference between symbols of the block is minimized.

When the blocks are transmitted periodically every P samples, where P is equal or greater than N+R samples, the consecutive start times of the blocks to be processed by the transmitter are given as l=k'+i*P, where i is an integer. At the beginning of the transmission of a sequence of symbol blocks, at least two identical blocks with a length of N samples are transmitted repeatedly (i.e., a training sequence is transmitted).

First, the receiver applies the following metric m(l) to the received signal:

$$m(l) = \sum_{n=l}^{l+N+R} r^*(n)(r(n+P)), \quad (2)$$

where r(n) refers to the received baseband signal samples and r*(n) refers to the complex conjugated samples. As described above, during a training sequence, at least two identical blocks are transmitted repeatedly with a time of P−N samples between the blocks.

Next, the receiver estimates an optimal time offset by searching a maximum absolute value of the metric:

$$\max_{l'=l} |m(l)|, \quad (3)$$

where l' refers to the estimate of optimal time offset k'.

The metric shown above in equation (2) can also be expressed as:

$$m'(l) = \sum_{n=l}^{l+N+R} r^*(n)(r(n+P)). \quad (4)$$

The notation of the metric in equation (4) is equivalent to that shown in equation (2), but the notation of equation (4) takes into account the causality of the processing, such that the receiver can only start the estimation of l' while receiving the second block. Therefore, the optimal time offset l' of the second block is estimated by searching a maximum absolute value expressed as:

$$\max_{l'=l} |m'(l)| \quad (5)$$

Then, the optimal time offset k' for the first block can be evaluated based on l', where k'=l'−P.

Figure 4:
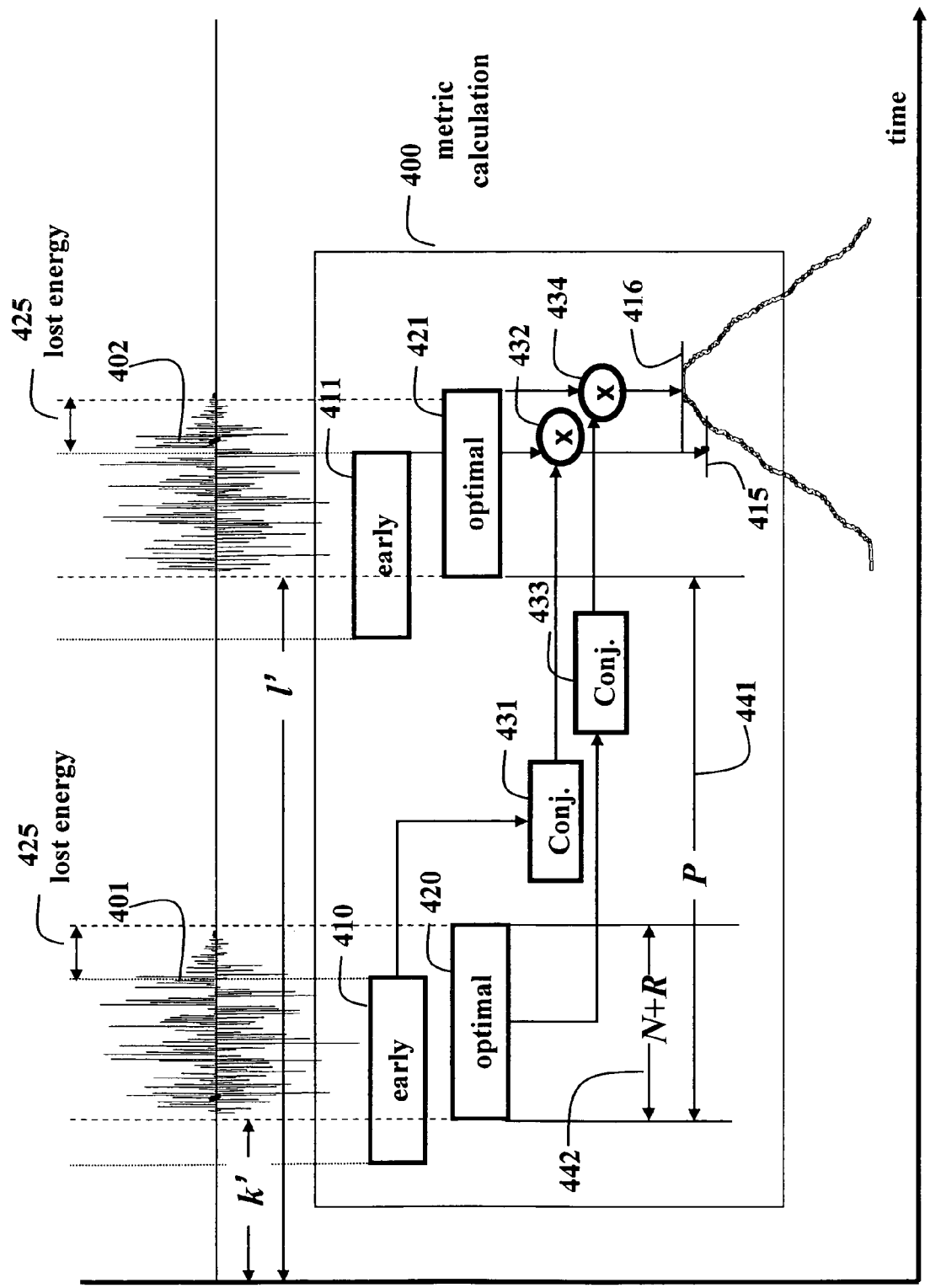
FIG. 4 illustrates a timing diagram of a metric calculation generating early and optimal time offset estimates for two received OFDM symbol blocks.

FIG. 4 illustrates a timing diagram of a metric calculation generating early and optimal time offset estimates for two received symbol blocks. As shown in FIG. 4, OFDM symbol blocks 401 and 402 are received during a training period. As described above, each received block has a length 442 of N+R samples and is transmitted with a period 441 of P samples, where P is equal to or greater than N+R samples. Early sampling windows 410 and 411 and optimal sampling windows 420 and 421 each have a length of N+R samples 442. Additionally, first block 410 has an optimal time offset k' and second block 402 has an optimal time offset l'.

Note that the received symbol blocks 401 and 402 need not be consecutively received. For example, the synchronization techniques described herein can be implemented in frequency hopping networks, where identical training symbols are transmitted according to a frequency hopping pattern, as described in related U.S. patent application No. TBD, entitled "Detecting and Synchronizing to Frequency Hopped Packets," filed concurrently herewith. For one frequency hopping pattern, a first symbol is transmitted in a first frequency sub-band, a second symbol in a second frequency sub-band, a third symbol in a third frequency sub-band, and a fourth symbol in the first frequency sub-band. In this case, synchronization can be performed based on the first and the fourth symbols in the first frequency sub-band.

In accordance with an aspect of the present disclosure, the sampling windows can be implemented with a length that is less than the length of a received symbol (N+R). In this case, the sampling window is implemented with a length of N+G samples, where G<R. One reason for shortening the length of the sampling window is to avoid collecting too much noise when the signal energy is significantly spread in time, such that the signal energy becomes barely noticeable. A second reason for shortening the length of the sampling window is to accommodate time constraints imposed by frequency hopping networks, which switch from one frequency sub-band to another frequency sub-band according to a frequency hopping pattern.

In a first example, the metric calculation 400 illustrated in FIG. 4 generates a time offset estimate that is too early. In this case, the early sampling windows 410 and 411 do not capture all of the signal energy of the received symbol blocks 401 and 402, respectively, and an amount of signal energy 425 is lost. In a second example, the metric calculation 400 generates a time offset estimate that is optimal (k' and l'). In this case, optimal sampling windows 420 and 421 capture all of the signal energy of the N+R samples of the received symbol blocks 401 and 402, respectively.

An efficient recursive way to determine the metric defined by equation (4) is:

$$m'(l)=m'(l-1)+r^*(l-P)*r(l)-r^*(l-P-N-R-1)*r(l-N-R-1), \quad (6)$$

where the '+' operation indicates conjunction operations 431 and 433, and the '*' operation indicates multiplication operations 432 and 434, as shown in FIG. 4.

Thus, the metric is calculated for every sample by sliding the N+R window in time, one sample at a time. This recursive way to compute the metric allows the reuse of a previous estimation in the calculation of a next estimation. In other words, as the window slides one sample in time, the contribution of a first sample within the N+R window is removed from the value of the metric and the contribution of an N+R+$1^{th}$ sample is added. The metric can be calculated based on a shift of one sample or on a shift of a group of samples between calculations.

As shown in FIG. 4, when the early time offset estimate is used in the metric calculation 400, the receiver selects samples of the symbol 401 falling within the early sampling window 410 and calculates a complex conjugate 431 of these samples. The receiver also selects samples of the symbol 402 falling within the early sampling window 411 and multiplies 432 these samples by the complex conjugate samples, producing a signal having a relatively small absolute energy 415. In comparison, when the optimal time offset estimate (k') is used in the metric calculation 400, the receiver selects samples of the symbol 401 falling within the optimal sampling window 420 and calculates a complex conjugate 433 of these samples. The receiver also selects samples of the symbol 402 falling within the optimal sampling window 421 and multiplies 434 these samples by complex the conjugate samples, producing a signal having a maximum absolute energy 416.

Figure 5:
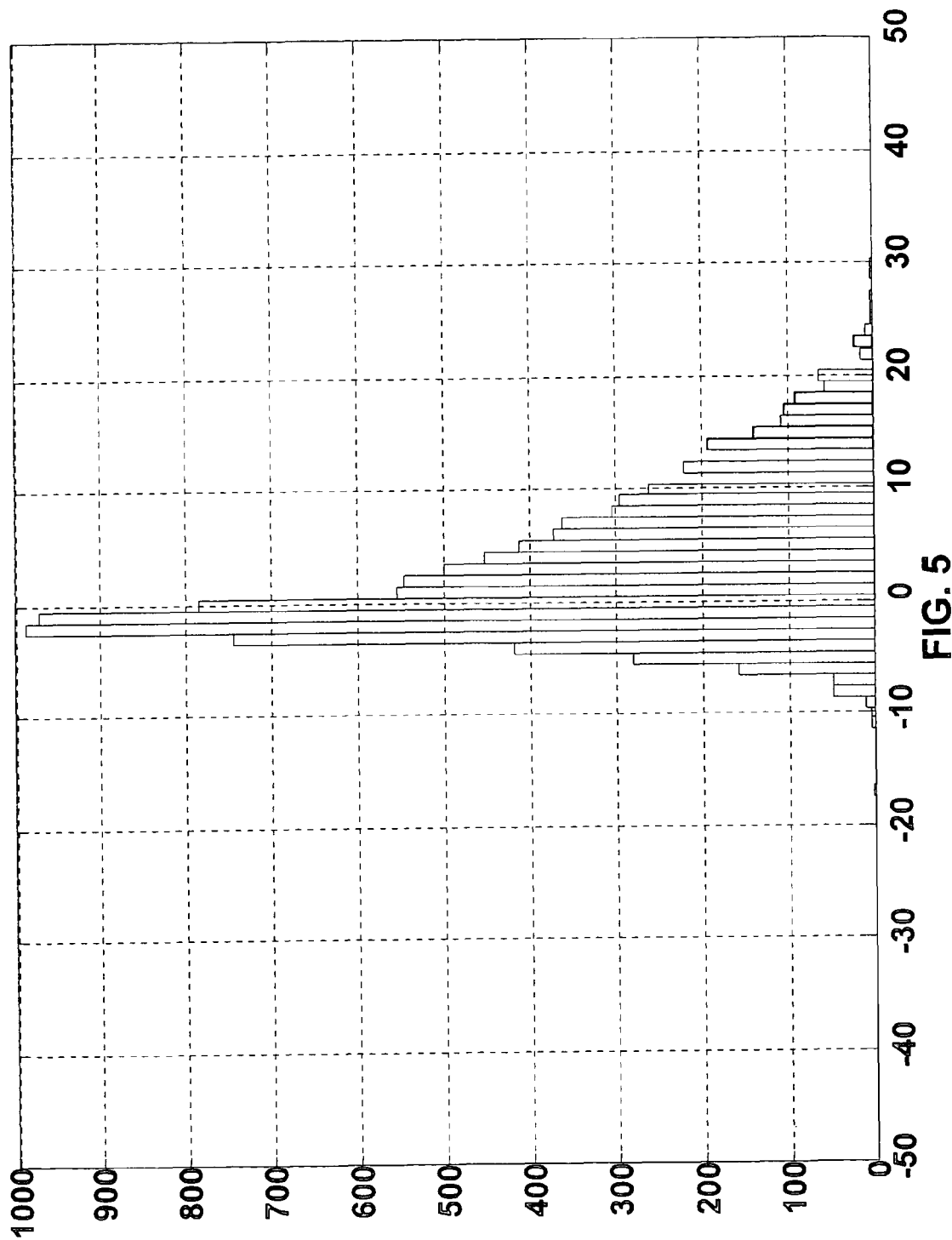
FIG. 5 is a histogram of a distribution of an error of an estimated timing as a function of an offset of an OFDM frame.

Due to the imperfect nature of the wireless communications channel, the output of the correlation metric calculation (6) does not produce a perfect peak. FIG. 5 is an exemplary histogram showing a distribution of an error of the estimated timing l'–P compared to the optimal timing k'. The error, which is defined by the expression k'–l'+P, can be positive or negative. For a decaying channel impulse response the error is more likely to be positive.

In accordance with an aspect of the present disclosure, searching for a maximum of the correlation metric provides a reliable estimate of the optimal timing offset k'. The metric of equation (6) is an estimate of a correlation between the received signal and a version of the received signal delayed by time period P. Selection of the N+R samples used in the metric calculation 400 provides for greater accuracy of the synchronization. Note that 2(N+R) samples are actually selected for calculating the estimate (i.e., N+R samples of the first received symbol and N+R samples of the second received symbol). Even though only N samples are transmitted for each block, in awareness of the time dispersive characteristics of the channel and the processes at the receiver, the estimate of the correlation is based on N+R samples. Additionally, because the received signal can include noise, the metric calculation only includes sample values greater than a predetermined threshold value to ensure that relatively small local maxima, due to noise, are not considered in the estimation.

In accordance with another aspect of the present disclosure, an estimate of a carrier frequency offset is determined based on a phase of the complex conjugate samples at the maximum absolute value of the correlation metric according to:

$$f_{off} = \frac{\arg\{m'(l')\}}{2*\pi*P*T_S}, \quad (7)$$

where $T_S$ refers to a time duration of one sample. A non-ideal transmitter can introduce a slight shift in carrier frequency between the first and second symbols. The receiver can calculate and correct the offset according to equation (7).

The absolute value of the maximum of the metric m'(l') is related to an average signal power and can be used as an estimate of signal strength. For example, the metric can be used with a threshold as an indicator for the beginning of a sequence of symbols in a block, assuming that the sequence starts by sending two identical blocks in a time of P samples.

Additionally, if more than two identical blocks are transmitted, then the metric m(l) can be evaluated several times to identify more than one maximum. The estimates of the optimal time offset and the carrier frequency offset can be based on a combination of the different estimates, where each estimate is related to one local maximum of the metric. For example, the estimates can be combined by calculating an average or a weighted average of the estimates.

The techniques described above are unique because the correlation metric is based on two received symbols as opposed to a received symbol and a pre-stored pattern. For this reason, the techniques described herein are particularly advantageous for estimating an optimal timing offset and determining a carrier frequency offset for inferior wireless communications channels that might be highly time dispersive due to multipaths and long delay spread.

Exemplary Synchronization System for Reducing Time Dispersive Effects

Figure 6:
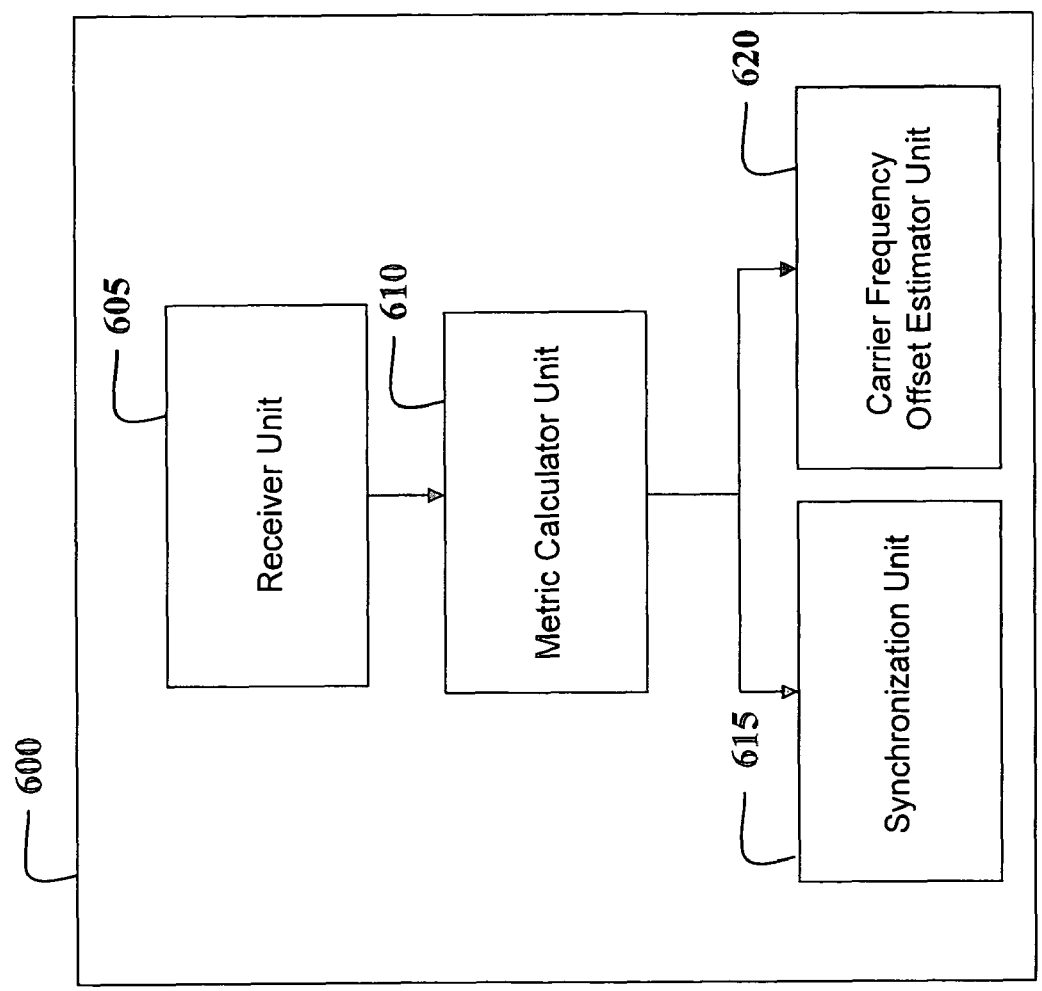
FIG. 6 illustrates a synchronization system for receiving communications transmitted over a time dispersive wireless channel in accordance with an exemplary embodiment of the present disclosure.

FIG. 6 illustrates a synchronization system 600 for receiving communications transmitted over a time dispersive wireless channel in accordance with an exemplary embodiment of the present disclosure. It should be noted that in accordance with an aspect of the present disclosure, the elements illustrated in FIG. 6 can be employed in conjunction with a computer-based system, and implemented in hardware, software, firmware, or combinations thereof.

The synchronization system 600 includes a receiver unit 605, a metric calculator unit 610, a synchronization unit 615, and a carrier frequency offset estimator unit 620. During a training period, the receiver unit 605 receives a signal over a time dispersive wireless channel that includes identical first and second symbols. The metric calculator unit 610, which is coupled to the receiver unit 605, calculates a correlation metric for each sampling time by correlating respective samples of the first symbol included in a first sampling window with respective samples of the second symbol included in a second sampling window. For example, the metric calculator unit 610 can calculate the metric according to equation (4), as described in detail above.

The metric calculator unit 610 then identifies a sampling time at which the metric attains a maximum value. For example, the metric calculator unit 610 can identify this sampling time according to equation (5), as described in detail above. Based on the identified sampling time, the metric calculator unit 610 determines an optimal time offset for synchronizing to the received signal. For example, as described above, the relation l'–P is an estimate of the optimal time offset k' for the first symbol block, where l' is an optimal time offset of the second symbol block. As shown in FIG. 6, the synchronization system 600 further includes the synchronization unit 615, which is coupled to the metric calculator unit 610. Based on the optimal time offset generated by the metric calculator unit 610, the synchronization unit 615 synchronizes to the received signal to mitigate the time dispersive characteristics of the wireless channel.

Optionally, the synchronization system 600 includes a carrier frequency offset estimator unit 620, which is coupled to the metric calculator unit 610. Based on the phase of the complex conjugate samples at the maximum absolute value of the metric calculated by the metric calculator unit 610, the carrier frequency offset estimator unit 620 estimates a carrier frequency offset between a first and a second identical received signal. For example, the carrier frequency offset estimator unit 620 can estimate a carrier frequency offset according to equation (7), as described in detail above.

Exemplary Synchronization Method for Reducing Time Dispersive Effects

Figure 7:
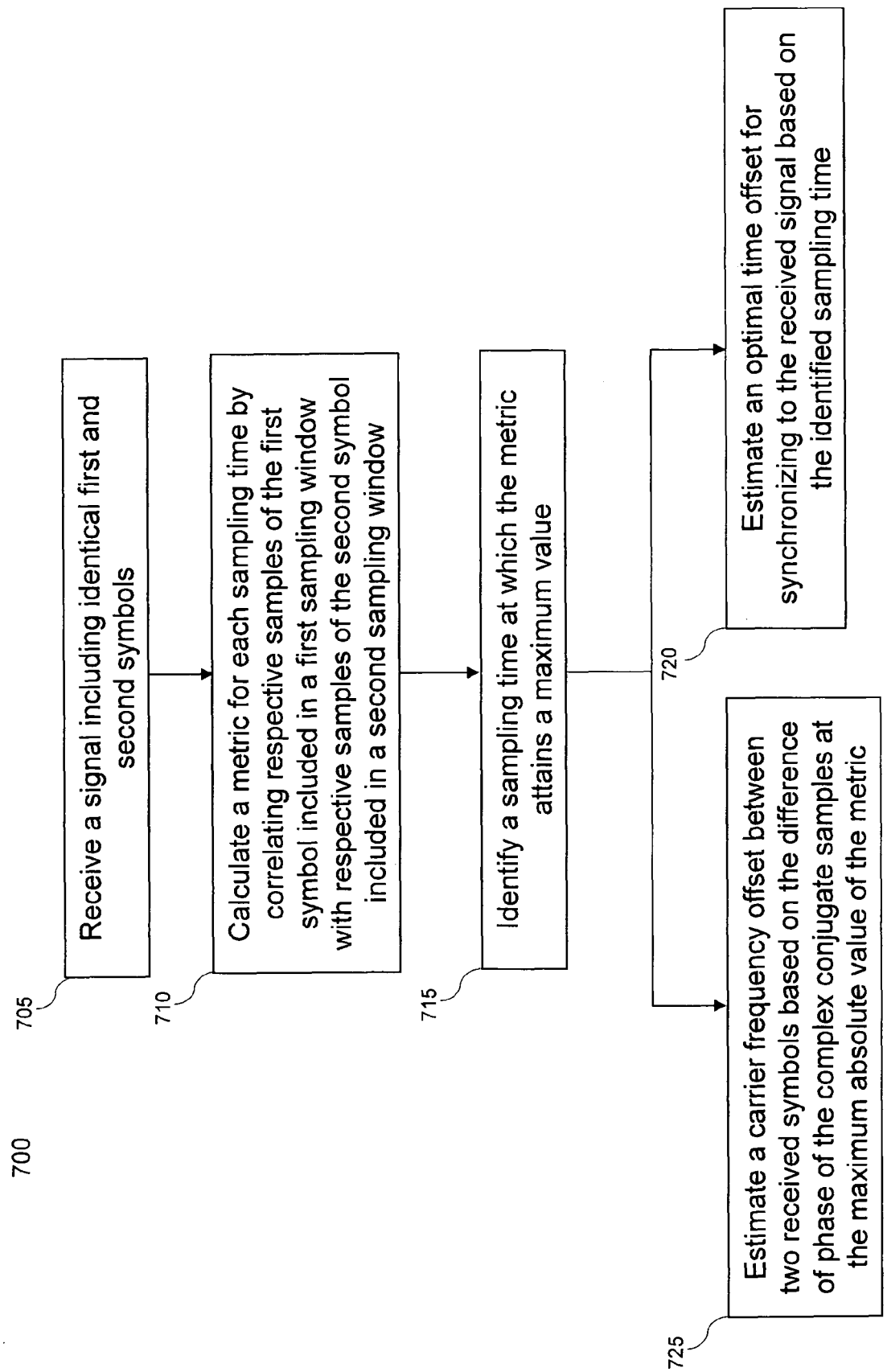
FIG. 7 is a flowchart providing steps for synchronization to reduce time dispersive effects of a wireless communications channel in accordance with an exemplary embodiment of the present disclosure.

FIG. 7 is flowchart providing steps for a synchronization method 700 for reducing the effects of a time dispersive wireless communications channel in accordance with an exemplary embodiment of the present disclosure. Not all of the steps of FIG. 7 have to occur in the order shown, as will be apparent to persons skilled in the relevant art(s) based on the teachings herein. Other operational and structural embodiments will be apparent to persons skilled in the relevant art(s) based on the following discussion. These steps are described in detail below.

It should be noted that in accordance with an aspect of the present disclosure, the method illustrated in FIG. 7 can be employed in conjunction with a computer-based system, where the method can be implemented in hardware, software, firmware, or combinations thereof.

In step 705, a signal including identical first and second symbols transmitted over a time dispersive wireless channel is received. As described above, during a training period, identical symbol blocks are repeatedly transmitted over the time dispersive channel to a receiver.

In step 710, a metric is calculated for each sampling time by correlating respective samples of the first received symbol included in a first sampling window with respective samples of the second received symbol included in a second sampling window. For example, as described above in conjunction with FIG. 4, samples of the received symbol 402 falling within the optimal sampling window 421 are multiplied with complex conjugate samples of the received symbol 401 falling within the optimal sampling window 420.

In step 715, a sampling time at which the metric calculated in step 710 attains a maximum value is identified. For example, the sampling time at which the metric calculated in step 710 attains a maximum value can be identified according to equations (3) or (5), which are described in detail above.

In step 720, an optimal time offset for synchronizing to the received signal is estimated based on the sampling time identified in step 715. For example, as described above, when equation (5) is implemented to identify an optimal time offset l' of the second symbol block, the relation l'−P represents an estimate of the optimal time offset k' for the first symbol block.

Optionally, in step 725, a carrier frequency offset is estimated based on the phase of the complex conjugate samples at the maximum absolute value of the metric determined in step 715. For example, the carrier frequency offset can be estimated according to equation (7), as described in detail above.

CONCLUSION

The present invention has been described with reference to a number of exemplary embodiments. However, it will be apparent to those skilled in the art that it is possible to embody the invention in specific forms other than those described above without departing from the spirit of the invention.

Accordingly, the various embodiments described herein are illustrative, and they should not be considered restrictive in any way. The scope of the invention is given by the appended claims, rather than the preceding description, and all variations and equivalents thereof that fall within the range of the claims are intended to be embraced therein.

What is claimed is:

1. A synchronization method for communications over a time dispersive wireless channel, comprising:
   receiving a signal at a wireless receiver comprising at least identical first and second symbols;
   calculating a metric for each of a plurality of sampling times by correlating respective samples of the first symbol included in a first sampling window with respective samples of the second symbol included in a second sampling window;
   identifying a sampling time at which the metric attains a maximum value;
   estimating an optimal time offset for synchronizing to the received signal based on the identified sampling time;
   repeating the receiving, calculating, identifying, and estimating steps a plurality of times to generate a plurality of optimal time offsets; and
   estimating a combined optimal time offset based on an average of the plurality of optimal time offsets.

2. The method of claim 1, further comprising the step of synchronizing to the received signal based on the optimal time offset to mitigate the time dispersive characteristics of the wireless channel.

3. The method of claim 1, wherein the first sampling window is separated in time from the second sampling window by a period of the first and second symbols.

4. The method of claim 1, further comprising the step of reestablishing orthogonality between tones of each received symbol based on cyclic prefix processing.

5. The method of claim 1, further comprising the step of reestablishing orthogonality between tones of each received symbol based on zero padding processing.

6. The method of claim 1, further comprising the step of estimating a carrier frequency offset based on the samples at the maximum absolute value of the metric.

7. A synchronization method for communications over a time dispersive wireless channel, comprising:
   receiving a signal at a wireless receiver comprising at least identical first and second symbols;
   calculating a metric for each of a plurality of sampling times by correlating respective samples of the first symbol included in a first sampling window with respective samples of the second symbol included in a second sampling window;
   wherein the length of each of the first and second sampling windows corresponds to a length of a received symbol, and the length of the received symbol exceeds a length of a transmitted symbol due to time dispersive characteristics of the wireless channel;
   identifying a sampling time at which the metric attains a maximum value; and
   estimating an optimal time offset for synchronizing to the received signal based on the identified sampling time.

8. A synchronization method for communications over a time dispersive wireless channel, comprising:
   receiving a signal at a wireless receiver comprising at least identical first and second symbols;
   recursively calculating a metric for each of a plurality of sampling times by correlating respective samples of a first symbol included in a first sampling window with respective samples of a second symbol included in a second sampling window, and conjugating a current calculation of the metric with a previous calculation of the metric;

identifying a sampling time at which the metric attains a maximum value; and estimating an optimal time offset for synchronizing to the received signal based on the identified sampling time.

9. A synchronization method for communications over a time dispersive wireless channel, comprising:

receiving a signal at a wireless receiver comprising at least identical first and second symbols;

calculating a metric for each of a plurality of sampling times by correlating respective samples of a first symbol included in a first sampling window with respective samples of a second symbol included in a second sampling window, based on respective samples of the first and second symbols that exceed a predetermined noise threshold;

identifying a sampling time at which the metric attains a maximum value; and estimating an optimal time offset for synchronizing to the received signal based on the identified sampling time.

10. A synchronization method for communications over a time dispersive wireless channel, comprising:

receiving a signal at a wireless receiver comprising at least identical first and second symbols;

calculating a metric for each of a plurality of sampling times by correlating respective samples of the first symbol included in a first sampling window with respective samples of the second symbol included in a second sampling window;

estimating a carrier frequency offset based on the samples at the maximum absolute value of the metric based on the phase of the complex conjugate samples at the maximum absolute value of the metric;

identifying a sampling time at which the metric attains a maximum value; and estimating an optimal time offset for synchronizing to the received signal based on the identified sampling time.

11. A synchronization method for communications over a time dispersive wireless channel, comprising:

receiving a signal at a wireless receiver comprising at least identical first and second symbols;

calculating a metric for each of a plurality of sampling times by correlating respective samples of the first symbol included in a first sampling window with respective samples of the second symbol included in a second sampling window;

comparing the metric to a threshold value to identify the beginning of a sequence of symbols, wherein the sequence of symbols includes at least two identical symbols;

identifying a sampling time at which the metric attains a maximum value; and estimating an optimal time offset for synchronizing to the received signal based on the identified sampling time.

12. A synchronization system for receiving communications transmitted over a time dispersive wireless channel, comprising:

a receiver unit configured to receive a signal comprising at least identical first and second symbols in which the length of each received symbol exceeds a length of a transmitted symbol due to time dispersive characteristics of the wireless channel; and a metric calculator unit coupled to the receiver unit, wherein the metric calculator calculates a metric for each of a plurality of sampling times by correlating respective samples of the first symbol included in a first sampling window with respective samples of the second symbol included in a second sampling window, wherein the metric calculator identifies a sampling time at which the metric attains a maximum value, and wherein the metric calculator determines an optimal time offset for synchronizing to the received signal based on the identified sampling time.

13. The system of claim 12, wherein a length of each of the first and second sampling windows corresponds to a length of a received symbol.

14. The system of claim 12, wherein a length of a received symbol exceeds a length of each of the first and second sampling windows.

15. The system of claim 12, wherein the first sampling window is separated in time from the second sampling window by a period of the first and second symbols.

16. The system of claim 12, further comprising a synchronization unit coupled to the metric calculator unit that synchronizes to the received signal based on the optimal time offset to mitigate the time dispersive characteristics of the wireless channel.

17. The system of claim 12, wherein the receiver unit is further configured to reestablish orthogonality between tones of each received symbol based on cyclic prefix processing.

18. The system of claim 12, wherein the receiver unit is further configured to reestablish orthogonality between tones of each received symbol based on zero padding processing.

19. A synchronization system for receiving communications transmitted over a time dispersive wireless channel, comprising:

a receiver unit configured to receive a signal comprising at least identical first and second symbols;

a metric calculator unit coupled to the receiver unit, wherein the metric calculator calculates a metric for each of a plurality of sampling times by correlating respective samples of the first symbol included in a first sampling window with respective samples of the second symbol included in a second sampling window, wherein the metric calculator identifies a sampling time at which the metric attains a maximum value, and wherein the metric calculator determines an optimal time offset for synchronizing to the received signal based on the identified sampling time; and a carrier frequency offset estimator coupled to the metric calculator unit, wherein the carrier frequency offset estimator estimates a carrier frequency offset based on the phase of the complex conjugate samples at the maximum absolute value of the metric.

* * * * *